(12) United States Patent
Endo et al.

(10) Patent No.: US 6,298,566 B1
(45) Date of Patent: *Oct. 9, 2001

(54) ANGULAR-DISPLACEMENT DETECTING DEVICE

(75) Inventors: Michiko Endo; Shigemi Kurashima; Naoyuki Nagao; Takuya Uchiyama; Hiroshi Hasegawa, all of Tokyo (JP)

(73) Assignee: Fujitsu Takamisawa Component Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 09/192,237

(22) Filed: Nov. 16, 1998

(30) Foreign Application Priority Data

Jan. 9, 1998 (JP) .................................................. 10-003408

(51) Int. Cl.[7] .............................. G01B 7/004; H01C 10/32
(52) U.S. Cl. ............................. 33/1 PT; 33/503; 338/114; 338/160

(58) Field of Search ................................... 33/1 PT, 1 N, 33/534, 503; 345/156; 338/68, 99, 101, 102, 111, 114, 125, 160, 162, 184, 196

(56) References Cited

U.S. PATENT DOCUMENTS

| | | | |
|---|---|---|---|
| 4,644,659 | * 2/1987 | Takahama | 33/1 PT |
| 5,435,067 | * 7/1995 | Uchida et al. | 33/1 PT |
| 5,754,301 | * 5/1998 | Schnaeker | 338/162 |
| 5,829,148 | * 11/1998 | Eaton | 33/1 PT |
| 5,886,615 | * 3/1999 | Burgess | 338/114 |

FOREIGN PATENT DOCUMENTS 9-230993    9/1997   (JP) .

* cited by examiner

Primary Examiner—Christopher W. Fulton
(74) Attorney, Agent, or Firm—Staas & Halsey LLP

(57) ABSTRACT

A device includes a coordinate-detecting sheet and a rotating member having a contact part which circularly slides on the coordinate-detecting sheet. Coordinate data of coordinates of the contact part on the coordinate-detecting sheet is output from the coordinate-detecting sheet.

17 Claims, 15 Drawing Sheets

— WIRING PATTERN FOR ELECTRODES

— TERMINAL (CONNECTED TO EXTERNAL TERMINAL)

— COATED BY RESIST EXCEPT TERMINALS

THROUGH-HOLE

ANGULAR-DISPLACEMENT DETECTING DEVICE

BACKGROUND OF THE INVENTION

1. Field of the Invention

The present invention generally relates to a coordinate-detecting device for detecting a position of a contact point based on voltages indicating the coordinates of the contact point, and particularly relates to a device having such a coordinate-detecting device for determining features related to an angular motion, for example, an angular displacement, an angular velocity and a number of rotations, of an operation part.

2. Description of the Related Art

Recently, information-processing devices such as personal computers and word processors are provided with improved operation systems and other improved characteristics so as to be easily manipulated by the users. Also, for such information processing devices, coordinate-detecting devices are commonly used as pointing devices rather than mouses. This is because the coordinate-detecting devices are simple to use.

However, such coordinate-detecting devices are limited to applications such as input means for the above-described information-processing device. Accordingly, there is a need for a coordinate-detecting device which can be used in a broader range of applications.

This can be achieved by adding a function for emulating a rotary encoder which can measure features related to an angular motion of an operation part, such as an angular displacement, and angular velocity and a number of rotations.

There has been a need for measuring features related to an angular motion in various applications, such as adjusting devices (e.g., a volume adjusting device, etc.) and car mount sensors. Devices actually used in the prior art are devices such as an optical rotary encoder for counting light beams passing through a slit, a magnetic rotary encoder for measuring features related to an angular motion by polarizing S and N poles, and a potentiometer of resistance-division type.

Among the above-described devices, the potentiometer of the resistance-division type has the simplest structure and is used in various fields.

The potentiometer of the resistance-division type measures an angular displacement of a contact point performing an angular motion on a resistive pad. In order to measure the angle of displacement, a constant voltage or a constant current is applied between a pair of electrodes and then a voltage at the contact point is detected. FIG. 1 is a perspective diagram showing a resistive pad 210 used in a potentiometer of a resistance-division type. The resistive pad 210 includes two sheets opposing each other with a gap between them. This structure is used as a contact surface of the pad 210. One of the sheets is provided with a resistive film 211 in a shape of a partially open ring and the other is provided with a conductive film 212. Further, the sheet provided with the resistive film 211 is provided with a pair of electrodes 213 such that the electrodes 213 are connected to the resistive film 211, respectively, at either end of the open part of the ring.

The coordinate-detecting device, which is one of the pointing devices, may be easily adapted to a graphical interface and has good operability. Therefore, such a coordinate-detecting device is now a major information input means used for a portable personal computer.

In the prior art, a coordinate-detecting device of an electromagnetic-induction type or a electrostatic-coupling type used to be major coordinate input means used for an information-processing device. However, a coordinate-detecting device of a voltage-detecting type using a resistive layer is overtaking the above-mentioned coordinate-detecting device of the prior art. This is because the coordinate-detecting device of a voltage-detecting type can detect an input with a cordless pen or a finger, has a long life, has a simple structure and is inexpensive.

The coordinate-detecting device of the voltage-detecting type using a prior-art resistive layer is provided with a coordinate input panel serving as coordinate input means. When there is an input on the coordinate input panel by a cordless pen or a finger, coordinate data is generated. The coordinate data thus obtained is used for operating a cursor based on a voltage obtained by touch on the coordinate input panel.

Further, the above-described coordinate-detecting device can recognize an input by a cordless pen or a finger as a single switch input based on the obtained voltage. In this case, the input will be sent to the information-processing device as single switch information, so as to enable operations such as an execution of a program on the information-processing device.

However, with the coordinate-detecting device of the related art, it is not possible to measure the features related to the movement of the operation part based on a voltage at a detected contact point.

The rotary encoder of the related art is capable of measuring the features related to the movement. However, for improved measuring accuracy, it is necessary to improve a pitch accuracy of the slits and a pitch accuracy of polarization. Therefore, higher mounting accuracy and edging accuracy is required for mounting components.

Also, there is a problem with the potentiometer of the resistance-division type in that accurate angle detection cannot be achieved when a contact point is on an electrode.

Therefore, there is a need for a device which can measure features relating to an angular motion without requiring high mounting accuracy and edging accuracy. Also, there is a need for a device which can carry out an accurate detection for all contact points.

SUMMARY OF THE INVENTION

Accordingly, it is a general object of the present invention to provide a device which can satisfy the needs described above.

It is another and more specific object of the present invention to provide a device which can achieve further improvement of the measuring accuracy and miniaturization.

In order to achieve the above objects,
a device includes a coordinate-detecting sheet; and
a rotating member having a contact part which circularly slides on the coordinate-detecting sheet,
coordinate data of coordinates of the contact part on the coordinate-detecting sheet being output from the coordinate-detecting sheet.

It is still another object of the invention to provide an angular displacement device which can measure features related to an angular motion, for example, an angular displacement, an angular velocity and a number of rotations, of an operation part, based on detected voltages at a contact point.

In order to achieve the above objects, an angular-displacement detecting device includes:
  a coordinate-detecting device of a voltage-detection type for detecting coordinate data of a contact point on a coordinate-detecting pad based on voltages corresponding to the contact point; and
  a sliding part capable of circularly sliding on the coordinate-detecting pad in an interlocked manner with an angular motion of an operation part which is rotatable about a shaft,
  wherein features related to the angular motion of the operation part are measured based on the detected coordinate data.

Also, with the angular-displacement detecting device of the above-described structure, fine adjustment of accuracy is possible by calculations carried out by software. Therefore, it is not necessary to have improved pitch accuracy of the slits and pitch accuracy of polarization, nor higher mounting accuracy and edging accuracy of mounting components.

It is still another object of the invention to provide an angular displacement detecting device which can solve the above-mentioned problem with the potentiometer of the resistance-division type.

In order to achieve the above object, the coordinate-detecting pad includes two sheets and insulating spacers provided between the sheets, the spacers being provided on the sheet in concentric circles having an axis of rotation as the center, or being provided on the sheet such that the sheet is exposed in an annular shape having the axis of rotation as the center.

Therefore, voltages of all contact points on the resistive layer can be measured.

Other objects and further features of the present invention will be apparent from the following detailed description when read in conjunction with the accompanying drawings.

DETAILED DESCRIPTION OF THE PREFERRED EMBODIMENTS

In the following, principles and embodiments of the present invention will be described with reference to the accompanying drawings.

Figure 3A:
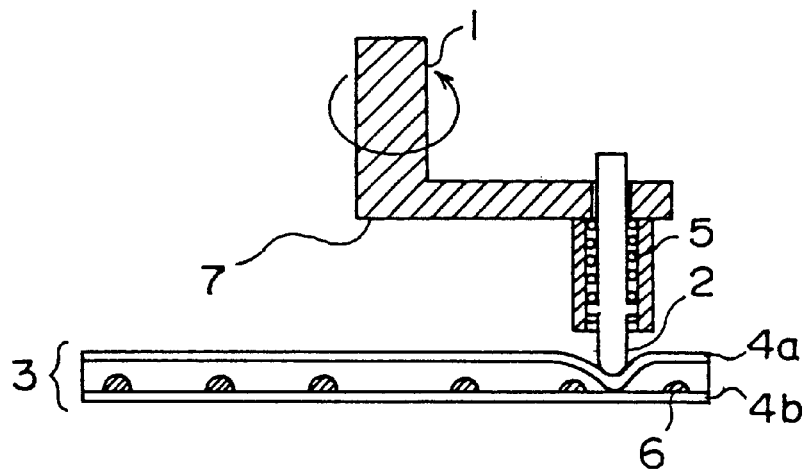
FIG. 3A is a diagram showing an angular-displacement detecting device of the present invention.
Figure 3B:
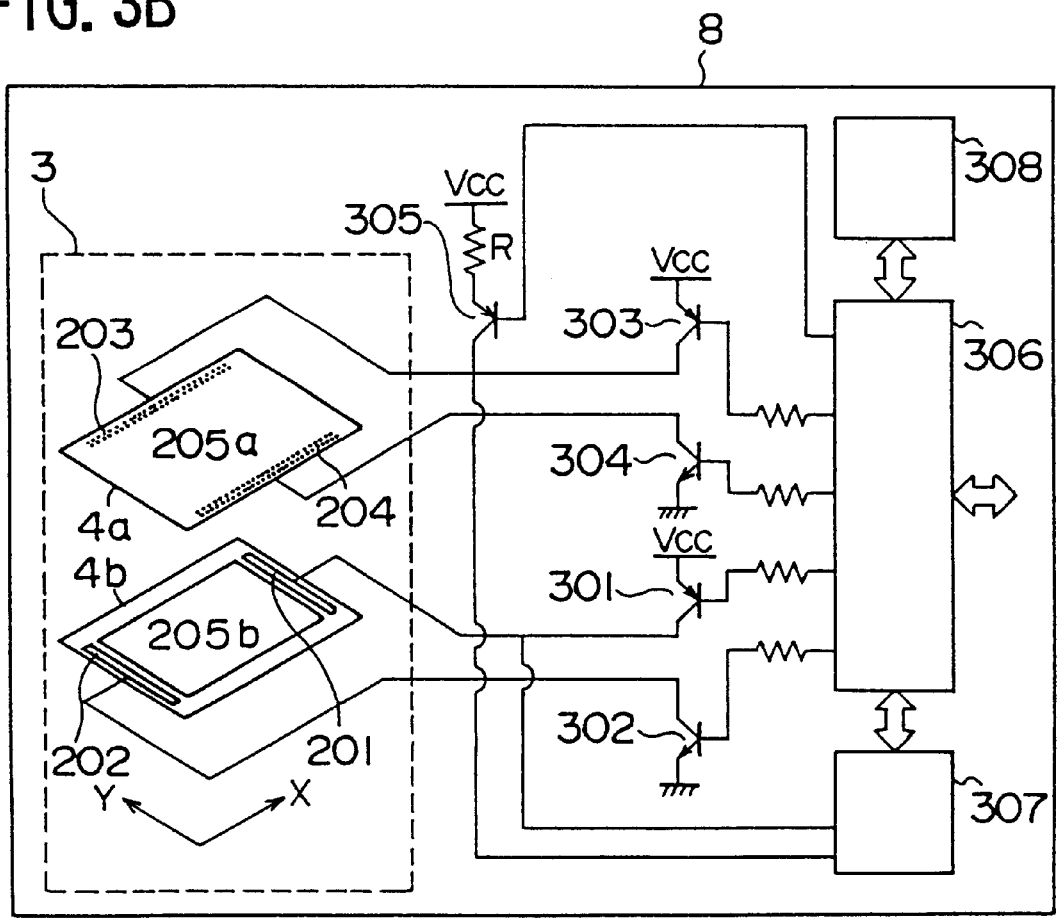
FIG. 3B is a diagram showing a coordinate-detecting device used in the angular-displacement detecting device of the present invention.

FIGS. 3A and 3B are diagrams showing an angular-displacement detecting device of the present invention and a coordinate-detecting device 8 used with the angular-displacement detecting device.

The angular-displacement detecting device of the present invention includes the coordinate-detecting device 8 of a voltage-detecting type and a contact part 2 which is capable of circularly sliding on a coordinate-detecting pad 3. When there is a touch on the coordinate-detecting pad 3, the coordinate-detecting device 8 detects a voltage at a contact point. The contact part 2 slides in an interlocked manner with an angular motion of an operation part 1, which is rotatable about a shaft 7. The angular-displacement detecting device of the present invention measures features related to an angular motion of the operation part 1 via a sliding motion of the contact part 2. The measurement is based on the voltage at the contact point detected by the coordinate-detecting device 8. It is to be noted that the contact part 2 is pressed by a recovery force of a spring 5.

The coordinate-detecting device 8 includes the coordinate-detecting pad 3 and a control part 306. The coordinate-detecting pad 3 serves as a contact surface for the contact part 2 to slide thereon. The control part 306 controls a predetermined voltage to be applied on the coordinate-detecting pad 3, a voltage detected at a voltage-detecting part 307 and information stored in a storage part 308. The coordinate-detecting device 8 produces coordinate data corresponding to x-coordinates and y-coordinates so as to recognize the position of a current contact point of the contact part 2. Finally, the coordinate-detecting device 8 measures the features related to angular motion of the operation part.

In FIG. 3B, the coordinate-detecting device 8 having a general structure is illustrated in order to describe a basic operation of the present invention. However, other coordinate-detecting devices are possible which have a structure limited to a function for measuring the features related to angular motion. Such coordinate-detecting devices will be described in the embodiments described later.

FIG. 3A is a diagram showing the coordinate-detecting pad 3 having two sheets 4a, 4b opposing each other with dot spacers 6 placed between the sheets 4a, 4b. The sheets 4a, 4b have a pair of electrodes, respectively, which are formed along the edges and located at opposite sides of resistive layers 205a, 205b.

The sheets 4a, 4b are located such that a pair of electrodes 203, 204 and a pair of electrodes 201, 202 formed on the respective sheets are perpendicular to each other. For example, as shown in FIG. 3B, the electrode 203 parallel to the x-axis may be used for detecting a voltage corresponding to a y-coordinate. Also, the electrode 201 parallel to the y-axis may be used for detecting a voltage corresponding to an x-coordinate. It is to be noted that the dot spacers 6 are made of an insulating material.

Further, the control part 306 alternately turns on a pair of transistors 301, 302 and a pair of transistors 303, 304. The transistors 301, 302 apply a voltage between the pair of electrodes 201, 202 and the transistors 303, 304 apply a voltage between the pair of electrodes 203, 204. Also, using a resistance R and a transistor 305, the control part 306 detects a contact between the contact part 2 and the coordinate-detecting pad 3.

Figures 16A, 16B:
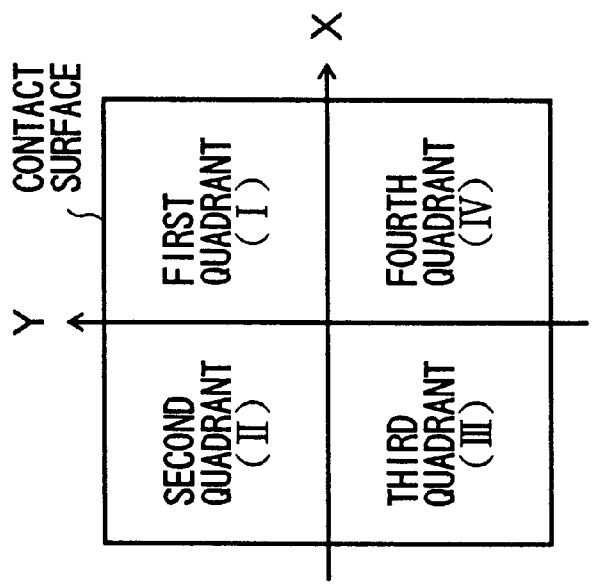
FIG. 16A is a diagram showing a contact surface divided into four quadrants.
FIG. 16B is a chart showing the relationship between the features related to an angular motion.

In the following, an operation of the angular-displacement detecting device of the present invention of the above-described structure will be described briefly. The contact surface on the coordinate-detecting pad 3 is divided into first to fourth quadrants (I, II, III, IV) as shown in FIG. 16A. Also, the shaft 7 is positioned at the center of the contact surface.

FIG. 16B is a chart showing the relationship between features related to angular motion. The top row of the chart will be taken as an example. If the initial contact point is either in the first quadrant (I) or in the second quadrant (II), and a relative value of the difference between the x-coordinate of the initial contact point and the x-coordinate of the current contact point is positive, then a direction of rotation is clockwise.

In an initial state, since the contact part 2 and the coordinate-detecting pad 3 are in contact, the position of the contact point is detected at the coordinate-detecting device 8.

When the two sheets 4a, 4b are in contact at an initial contact point, first, the control part 306 applies a predetermined voltage to the electrode 201. The applied voltage is divided at the contact point, and a divided voltage representing the x-coordinate is output via the electrode 203.

Then, the control part 306 applies a voltage to the electrode 203 in a similar manner. This voltage is divided at the contact point, and a divided voltage representing the y-coordinate is output via the electrode 201.

Thus, by alternately applying voltages to the electrodes 201 and 203, the voltage-detecting part 307 detects, for example, a voltage V1 representing the x-coordinate and a voltage V2 representing the y-coordinate. In the angular-displacement detecting device shown in FIG. 3A, since the contact part 2 and the coordinate-detecting pad 3 are always in contact, the control part 306 repeats the control for alternately applying voltages to the electrodes 201 and 203.

After detecting the divided voltages, the control part 306 accesses the storage part 308 so as to search for coordinate data corresponding to divided voltages representing the x-coordinate and the y-coordinate of the contact point detected at the voltage-detecting part 307. Thus, the control part 306 detects the position of the contact point in the initial state. In this case, the detected contact point is assumed to be located in the fourth quadrant (IV) shown in FIG. 16A.

In this state, the operation part 1 is rotated by the user. Then, the control part 306 periodically obtains the coordinate data in the above-described manner. The control part 306 calculates a relative value of the difference between the initial coordinate data and the current coordinate data. If the initial contact point exists in the fourth quadrant (IV) and, for example, the relative value of the y-coordinate is negative or the relative value of the x-coordinate is negative, the control part 306 determines that the direction of rotation of the contact part 2 is clockwise (FIG. 16B).

Now, the control part 306 can obtain an angle of rotation of the operation part 1 using the determined direction of rotation and the relative value. Also, the control part 306 can determine a number of rotations of the operation part 1 by periodically obtaining the coordinate data. Further, the control part 306 is capable of measuring not only the angle of rotation and the number of rotations, but also other features related to angular motion through calculations carried out by the software.

Also, in the above description, the features related to the angular motion of the operation part 1 are measured based on the coordinate data generated at the coordinate-detecting device 8. However, by modifying the software used with the coordinate-detecting device 8, it is also possible to measure the features related to the angular motion of the operation part 1 directly from the divided voltages.

According to the angular-displacement detecting device shown in FIG. 3A, the features related to the angular motion of operation part 1 are measured by calculating the coordinate data generated at the coordinate-detecting device 8. Therefore, it is possible to improve a measuring accuracy since fine adjustment is possible by modifying the software without requiring high mounting accuracy as in the rotary encoder of the related art.

Also, the coordinate-detecting pad 3 used in the angular-displacement detecting device of the present invention is very thin. Therefore, it is possible to provide an angular-displacement detecting device having reduced size and thickness.

In the following, embodiments of the angular-displacement detecting device of the present invention based on the structure shown in FIGS. 3A and 3B will be described with reference to the diagrams.

Figure 4:
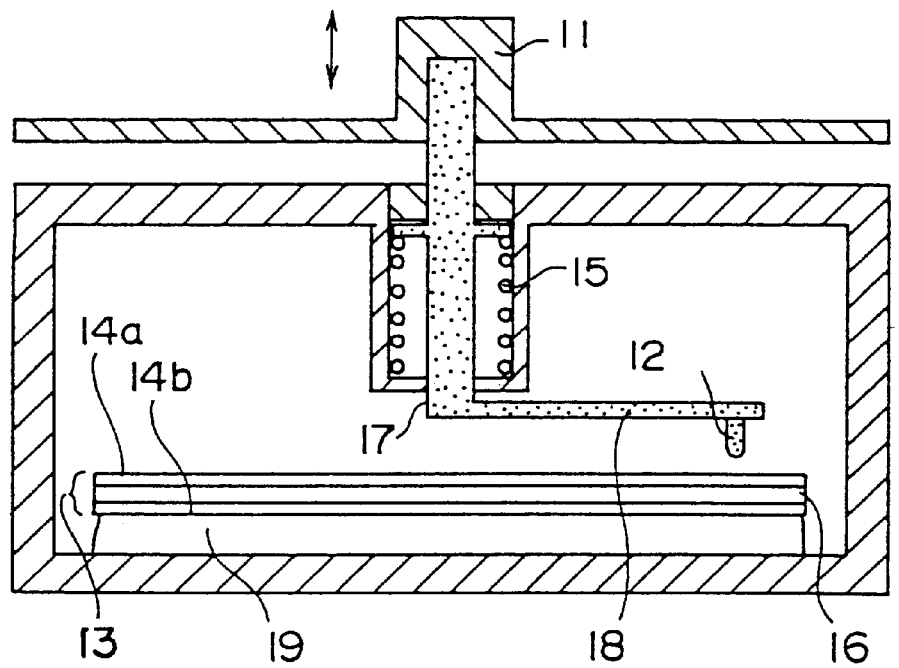
FIG. 4 is a cross-sectional diagram showing a first embodiment of the angular-displacement detecting device according to the present invention.

FIG. 4 is a cross-sectional diagram showing a first embodiment of the angular-displacement detecting device according to the present invention.

As shown in FIG. 4, the angular-displacement detecting device of the present embodiment includes a coordinate-detecting device 19 of a voltage-detecting type and a contact part 12 capable of circularly sliding on a coordinate-detecting pad 13 via an arm 18. The coordinate-detecting device 19 detects divided voltages at a contact point when there is a touch on the coordinate-detecting pad 13. The contact part 12 slides in an interlocked manner with an angular motion of an operation part 11, which is rotatable about a shaft 17. The angular-displacement detecting device of the present embodiment measures features, such as an angular displacement, an angular velocity and a number of rotations, related to an angular motion of the operation part 11 through a sliding motion of the contact part 12. The measurement is based on voltages at the contact point detected by the coordinate-detecting device 19.

The angular-displacement detecting device of the present invention is provided with a spring 15 placed around the shaft 17 and operable vertically upwards and downwards relative to the coordinate-detecting pad 13. The contact part 12 is normally in a non-contact state due to the recovery force of the spring 15 and will contact the coordinate-detecting pad 13 by depressing the operation part 11.

Figure 11:
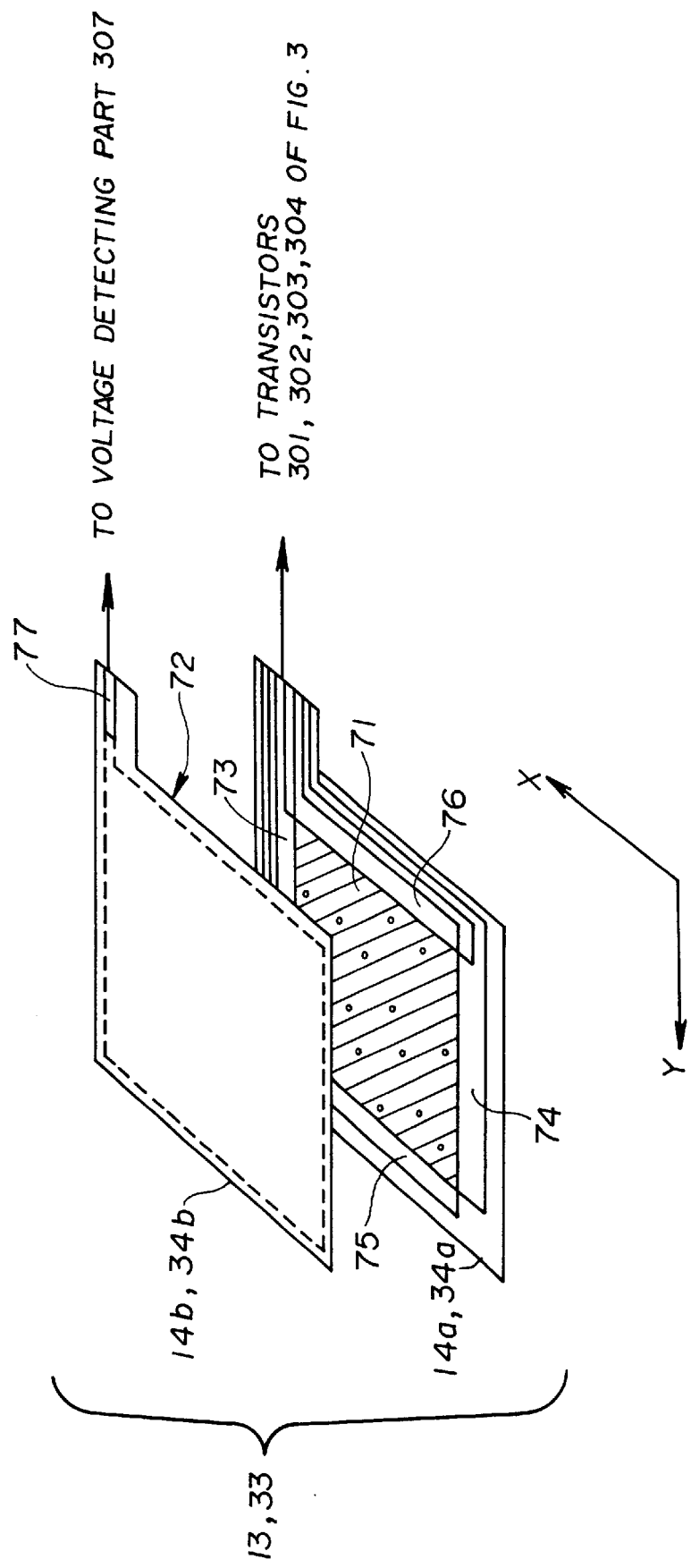
FIG. 11 is a diagram showing an example of a coordinate-detecting pad used in each embodiment of the present invention.

The coordinate-detecting device 19 of the present embodiment includes the coordinate-detecting pad 13 of the present invention (equivalent to a coordinate-detecting pad shown in FIG. 11). Also, the coordinate-detecting device 19 includes the voltage detecting part 307, the memory part 308 and the control part 306 of the coordinate-detecting device 8 shown in FIG. 3B. The coordinate-detecting pad 13 has a contact surface for the above-described part 12 to slide thereon. Also, for the coordinate-detecting device 19, identical components and identical functions as those described with reference to FIGS. 3A and 3B will be designated by identical reference numerals and will not be described in detail.

FIG. 11 is a diagram showing an example of a coordinate-detecting pad used in each embodiment of the present invention. The coordinate-detecting pad 13 has two sheets 14a, 14b opposing each other with insulating spacers 16 provided between the sheets 14a, 14b. Further, one sheet 14a is provided with a resistive layer 71 and the other sheet 14b is provided with a conductive layer 72.

The sheet 14a provided with the resistive layer 71 has two pairs of electrodes 73, 74 and 75, 76 provided at the edges and opposing each other with the resistive layer 71 placed between the pairs of electrodes. Also, the pair of electrodes 73, 74 and the pair of electrodes 75, 76 are positioned so as to be perpendicular to each other. For example, the voltage applied to the pair of electrodes 73, 74 is divided, so that a divided voltage (corresponding to the x-coordinate) is produced and detected at an electrode 77 on the sheet 14b. The voltage applied to the pair of electrodes 75, 76 is also divided, so that a divided voltage (corresponding to the y-coordinate) is produced and detected at the electrode 77 on the sheet 14b.

In the present embodiment, the coordinate-detecting pad 13 is described by way of an example of the coordinate-detecting pad shown in FIG. 11. However, the coordinate-detecting pad is not limited to the coordinate-detecting pad 13 and, for example, the coordinate-detecting pad 3 shown in FIGS. 3A and 3B can be used. Also, the spacers 16 are formed by an insulating material.

Further, the control part 306 implements a control for alternately turning on the pair of transistors 301, 302 which applies a voltage between the pair of electrodes 73, 74 and the pair of transistors 303, 304 which applies a voltage between the pair of electrodes 75, 76. Also, in the present embodiment, since the electrode 77 on the sheet 14b detects the voltages corresponding to the x-coordinate and y-coordinate, the control part 306 does not operate a transistor 305.

In the following, a processing operation of the angular-displacement detecting device of the present embodiment will be described.

In the following, the angular-displacement detecting device of the present embodiment will be described with reference to FIGS. 3 and 4. Normally (i.e., in an initial state), the contact part 12 and the coordinate-detecting pad 13 are in a non-contact state due to the recovery force of the spring 15. Thereby, the control part 306 will not carry out a process for detecting voltages at the contact point and will be in a stand-by mode, or a low-power-consumption mode.

In the initial state, if the user depresses the operation part 11, the two sheets 14a, 14b will be in contact at the point where the contact part 12 and the coordinate-detecting pad 13 are in contact. Then, the control part 306 starts the process for detecting the voltages at the contact point.

First, the control part 306 applies a predetermined voltage to the electrode 73. This voltage is divided at the contact point and output as a divided voltage representing an x-coordinate via the electrode 77 on the sheet 14b.

Next, the control part 306 applies a voltage similar to that described above to the electrode 75. This voltage is also divided at the contact point in a similar manner, and is output as a divided voltage representing a y-coordinate via the electrode 77 on the sheet 14b.

Thus, by alternately applying voltages on the electrode 73 and the electrode 75, the voltage-detecting part 307, for example, detects a divided voltage V1 representing the x-coordinate and a divided voltage V2 representing the y-coordinate.

After detecting the divided voltages, the control part 306 accesses the storage part 308 so as to search for coordinate data corresponding to divided voltages representing the x-coordinate and the y-coordinate of the contact point detected at the voltage detecting part 307. Thus, the control part 306 detects the position of the contact point in the initial state based on the obtained coordinate data which corresponds to a starting point of the angular motion of the operation part 11. In this case, the detected contact point is assumed to be located in the fourth quadrant (IV) shown in FIG. 16A.

When the user rotates the operation part 11, the control part 306 periodically obtains the coordinate data in the manner described above. For obtaining the data, the control part 306 calculates a relative value from the difference between the initial coordinate data and the current coordinate data. If the initial contact point exists in the fourth quadrant (IV) and, for example, the relative value of the y-coordinate is negative or the relative value of the x-coordinate is negative, the control part 306 recognizes that the direction of rotation of the contact part 12 is clockwise (FIG. 16B).

Now, the control part 306 can obtain an angle of rotation of the operation part 11 using the determined direction of rotation and the relative value. Also, the control part 306 can determine a number of rotations of the operation part 11 by periodically obtaining the coordinate data. Further, the control part 306 is capable of measuring not only the angle of rotation and the number of rotations, but also other features related to angular motion through calculations carried out by the software.

Also, in the present embodiment, the features related to the angular motion of the operation part 11 are measured based on the coordinate data generated at the coordinate-detecting device 19. However, by modifying the software used with the coordinate-detecting device 19, it is also possible to measure the features related to the angular motion of the operation part 11 directly from the voltages.

Figure 5:
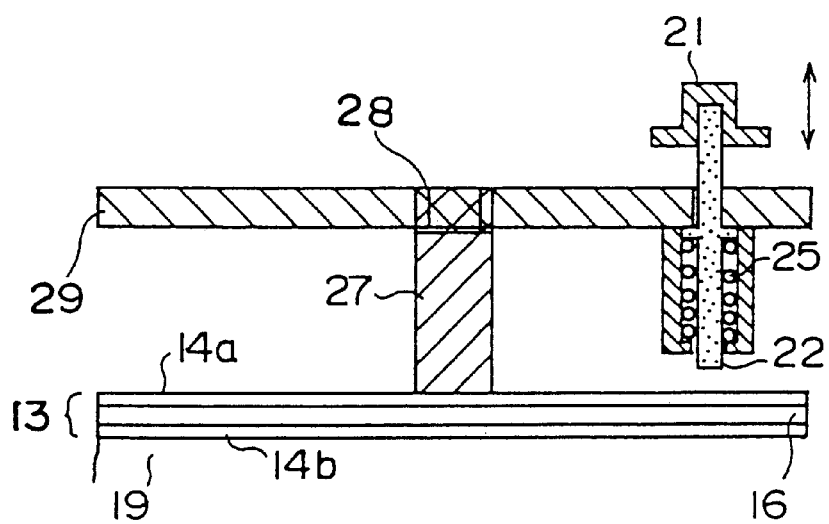
FIG. 5 is a cross-sectional diagram showing a second embodiment of the angular-displacement detecting device according to the present invention.

FIG. 5 is a cross-sectional diagram showing a second embodiment of the angular-displacement detecting device according to the present invention.

As shown in FIG. 5, the angular-displacement detecting device of the present embodiment includes a coordinate-detecting device 19 of a voltage-detecting type and a contact part 22 capable of circularly sliding on the coordinate-detecting pad 13. The coordinate-detecting device 19 is identical to that used in the first embodiment shown in FIG. 4. The contact part 22 is held by a wheel 29 connected to a shaft 27 via a bearing 28. The contact part 22 slides in an interlocked manner with an angular motion of an operation part 21 which is rotatable about the shaft 27 with a constant radius. The angular-displacement detecting device of the present embodiment measures features related to an angular motion of the operation part 21 through a sliding motion of the contact part 22. The measurement is based on the divided voltages of the contact point detected at the coordinate-detecting device 19.

The angular-displacement detecting device of the present invention is provided with a spring 25 placed around the contact part 22 and operable vertically upwards and downwards relative to the coordinate-detecting pad 13. The contact part 22 is normally in a non-contact state due to the recovery force of the spring 25 and will contact the coordinate-detecting pad 13 by depressing the operation part 21.

An operation of the angular-displacement detecting device of the present embodiment will not be described, since it is similar to the operation described for the first embodiment shown in FIG. 4.

Also, the angular-displacement detecting device of the second embodiment shown in FIG. 5 has the same effect as that of the first embodiment shown in FIG. 4.

According to the first and second embodiments of the angular-displacement detecting device shown in FIGS. 4 and 5, it is possible to obtain the same effects as that of the angular-displacement detecting device shown in FIGS. 3A and 3B. Further, it is not always necessary for the coordinate-detecting device 19 to monitor the divided voltages produced upon a contact, since the contact parts 12, 22 and the coordinate-detecting pad 13 are normally in a non-contact state. Therefore, it is possible to reduce power consumption in a normal state.

Also, according to the first and second embodiments of the angular-displacement detecting device, a radius of rotation of the contact parts 12, 22 is constant. Therefore, the first and second embodiments of the angular-displacement detecting device is characterized in that the contact point between the contact parts 12, 22 and the coordinate-detecting pad 13 always traces the same circular path.

The coordinate-detecting pad 13 used in the first and second embodiments can be replaced by a coordinate-detecting pad described below.

Figure 12:
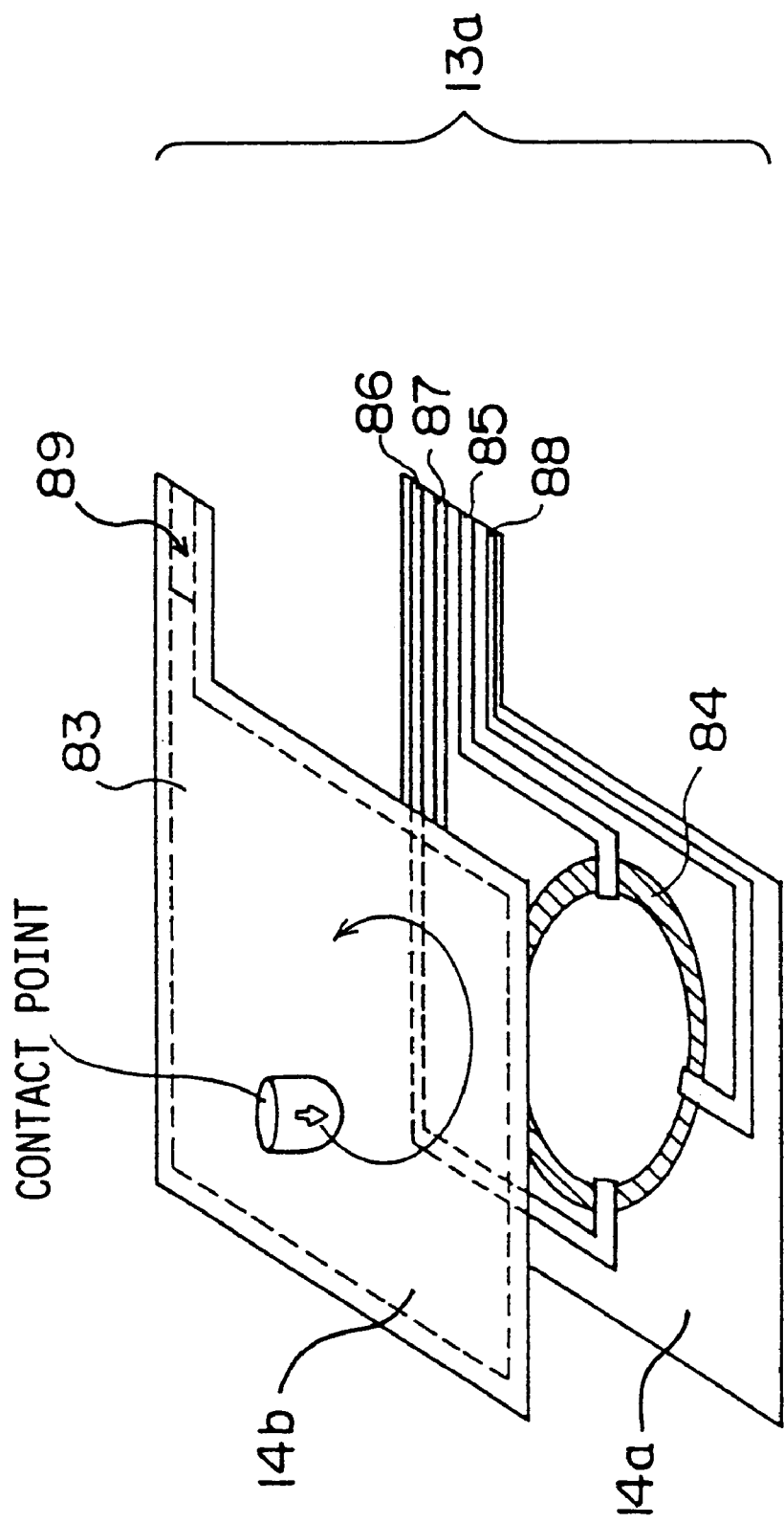
FIG. 12 is a diagram showing another example of a coordinate-detecting pad used in each embodiment of the present invention.

FIG. 12 is a diagram showing another example of a coordinate-detecting pad used in each embodiment of the present invention. The coordinate-detecting pad 13a has two sheets 14a, 14b opposing each other with insulating spacers 16 provided between the sheets 14a, 14b. Further, one sheet 14a is provided with a ring-shaped resistive layer 84 and the other sheet 14b is provided with a conductive layer 83.

The sheet 14a provided with the resistive layer 84 has two pairs of electrodes 85, 86 and 87, 88 provided on the ring-shaped resistive layer 84. The electrodes 85 and 86 are placed so as to be diametrically opposite, and the electrodes 87 and 88 are placed so as to be diametrically opposite and shifted by 90 degrees from the electrodes 85 and 86, respectively.

Figure 14:
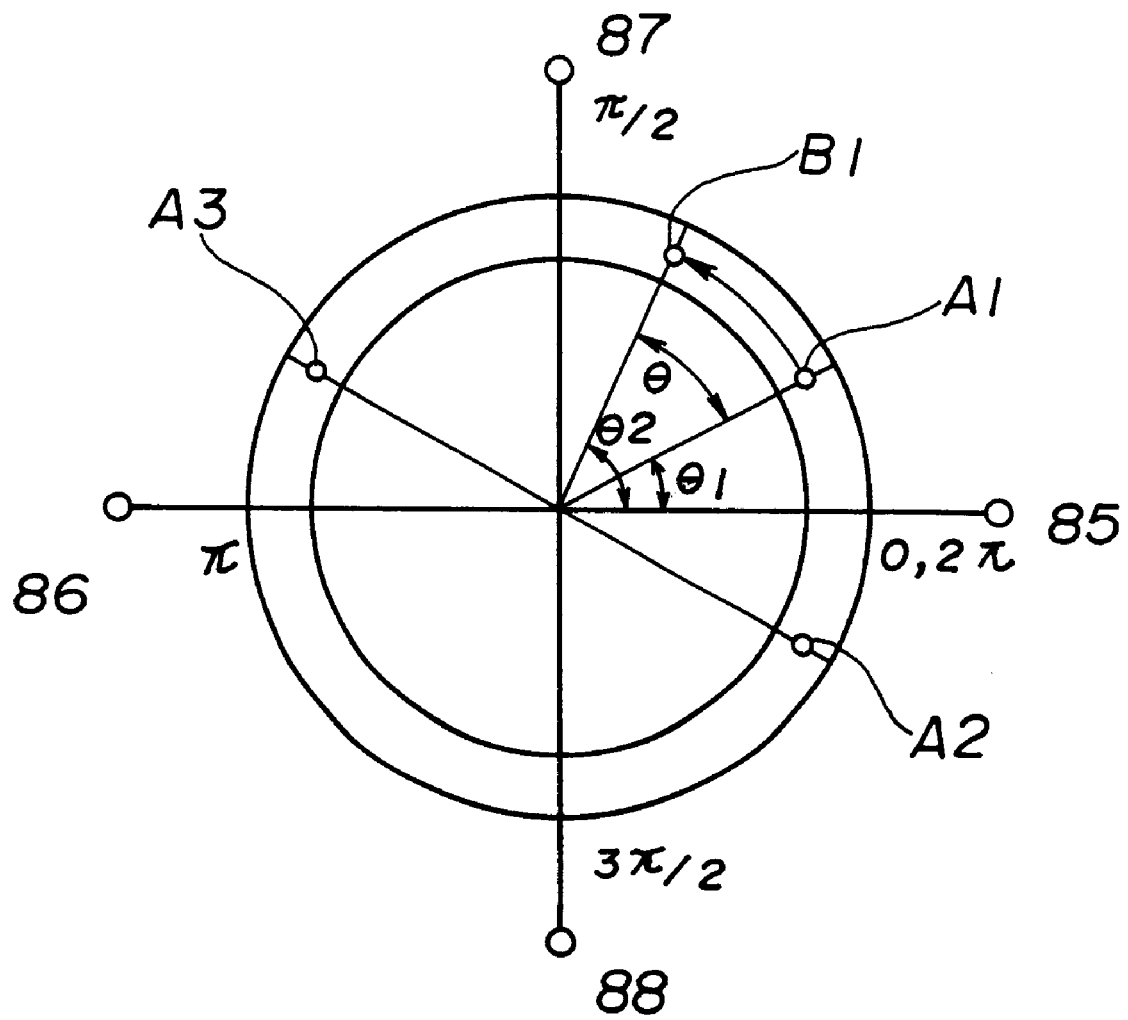
FIG. 14 is a diagram showing a principle of the angular-displacement detecting device when using the coordinate-detecting device shown in FIG. 12.
Figure 17:
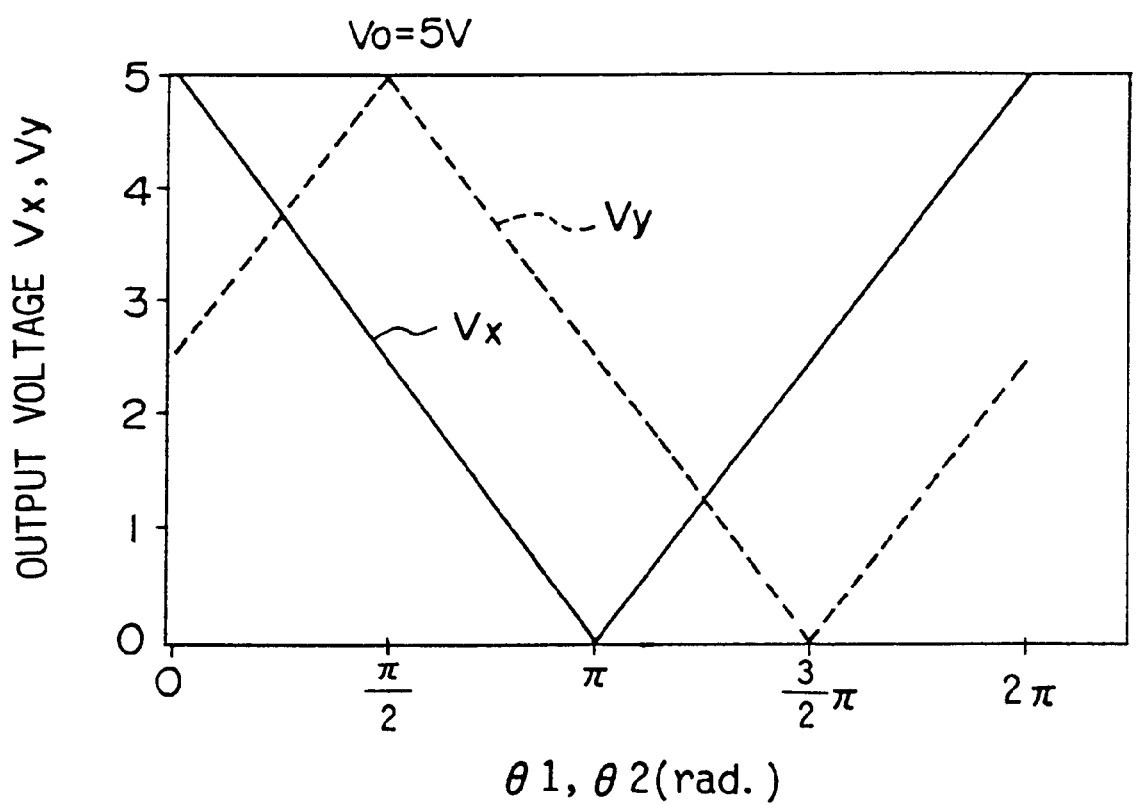
FIG. 17 is a graph showing parameters used for measuring the angular displacement.

Referring to FIGS. 14 and 17, a process for detecting angular displacements θ using the coordinate-detecting pad 13a, instead of the coordinate-detecting pad 13, will be described. The following description will be based on the embodiment shown in FIG. 4. However, the embodiment shown in FIG. 5 is also operable in the same manner.

Referring to FIGS. 3 and 4, normally (i.e., in an initial state), the contact part 12 and the coordinate-detecting pad 13a are in a non-contact state due to the recovery force of the spring 15. Thereby, the control part 306 will not carry out a process for detecting voltages at the contact point and will be in a stand-by mode, or a low-power-consumption mode.

When the user depresses the operation part 11 in the initial state, the two sheets 14a, 14b will be in contact at the point where the contact part 12 and the coordinate-detecting pad 13a are in contact. Then, the control part 306 starts detecting the divided voltages at the contact point.

In the following description, reference is also made to FIG. 14. First, the control part 306 applies a predetermined voltage V0 to the electrode 85 with the electrode 86 grounded. This voltage V0 is divided at the contact point (A1) and output via an electrode 89 on the sheet 14b. The divided voltage Vx output via the electrode 89 on the sheet 14b can be expressed as:

$Vx=V0(1-\theta 1/\pi)$ where $0 \leq \theta 1 \leq \pi$ $Vx=V0(\theta 1/\pi-1)$ where $\pi \leq \theta 1 < 2\pi$, where the angle from the electrode 85 to the initial contact point (A1) is θ1. The above equations for Vx may be graphed as shown in FIG. 17.

The angle θ1 corresponding to the divided voltage Vx can be specified from the graph shown in FIG. 17. However, as shown in FIG. 17, there may be two possible solutions for the angle θ1 corresponding to the divided voltage Vx. Thus, as shown in FIG. 14, the control part 306 obtains two positions (A1, A2) as possible contact points corresponding to the voltage Vx.

Then, the control part 306 applies the voltage V0 to the electrode 87 with the electrode 88 grounded. The voltage V0 is divided in a similar manner and is output via the electrode 89 on the sheet 14b.

Now, the divided voltage Vy output via the electrode 89 on the sheet 14b can be expressed as:

$Vy=V0(1/2+\theta 1/\pi)$ where $0 \leq \theta 1 \leq \pi/2$ $Vy=V0(3/2-\theta 1/\pi)$ where $\pi/2 \leq \theta 1 \leq 3\pi/2$ $Vy=V0(\theta 1/\pi-3/2)$ where $3\pi/2 \leq \theta 1 < 2\pi$, where the angle from the electrode 85 to the contact point (A1) is θ1 (see FIG. 14). The above equations for Vy are graphed as shown in FIG. 17.

The angle θ1 corresponding to the divided voltage Vy can be specified from the graph shown in FIG. 17. However, as shown in FIG. 17, there may be two possible solutions for the angle θ1 corresponding to the divided voltage Vy. Thus, as shown in FIG. 14, the control part 306 obtains two positions (A1, A3) as possible contact points corresponding to the voltage Vy.

Thus, by alternately applying voltages to the electrode 85 and the electrode 87, the voltage detecting part 307 can detect the voltages Vx and Vy. Then, two possible points (A1, A2) corresponding to the angle θ1 for the divided voltage Vx and two possible points (A1, A3) corresponding to the angle θ1 for the divided voltage Vy may be obtained as possible positions of the contact point with respect to the electrode 85.

Subsequently, as shown in FIG. 14, the control part 306 specifies the true position (A1) of the initial contact point by choosing an overlapping position corresponding to both the divided voltage Vx and the divided voltage Vy from the above-described possible points. In other words, the position of the contact point upon depression of the operation part 11 can be specified.

When the user rotates the operation part 11, the control part 306 periodically specifies the position of the contact point in the above-described manner. For example, as shown in FIG. 14, the position of the contact point (B1) after rotation of the operation part 11 is specified. That is to say, an angle θ2 from the electrode 85 to the contact point (B1) is specified.

In the case described above, the control part 306 can obtain the angle of rotation θ by calculating the difference between the current angle θ2 and the initial angle θ1.

Also, the control part 306 is capable of detecting a number of rotations of the operation part 11 by periodically specifying the position of the contact point. It is to be noted that the control part 306 not only measures an angular displacement and a number of rotations, but also measures other features related to an angular movement by calculations executed by the software.

Figure 13:
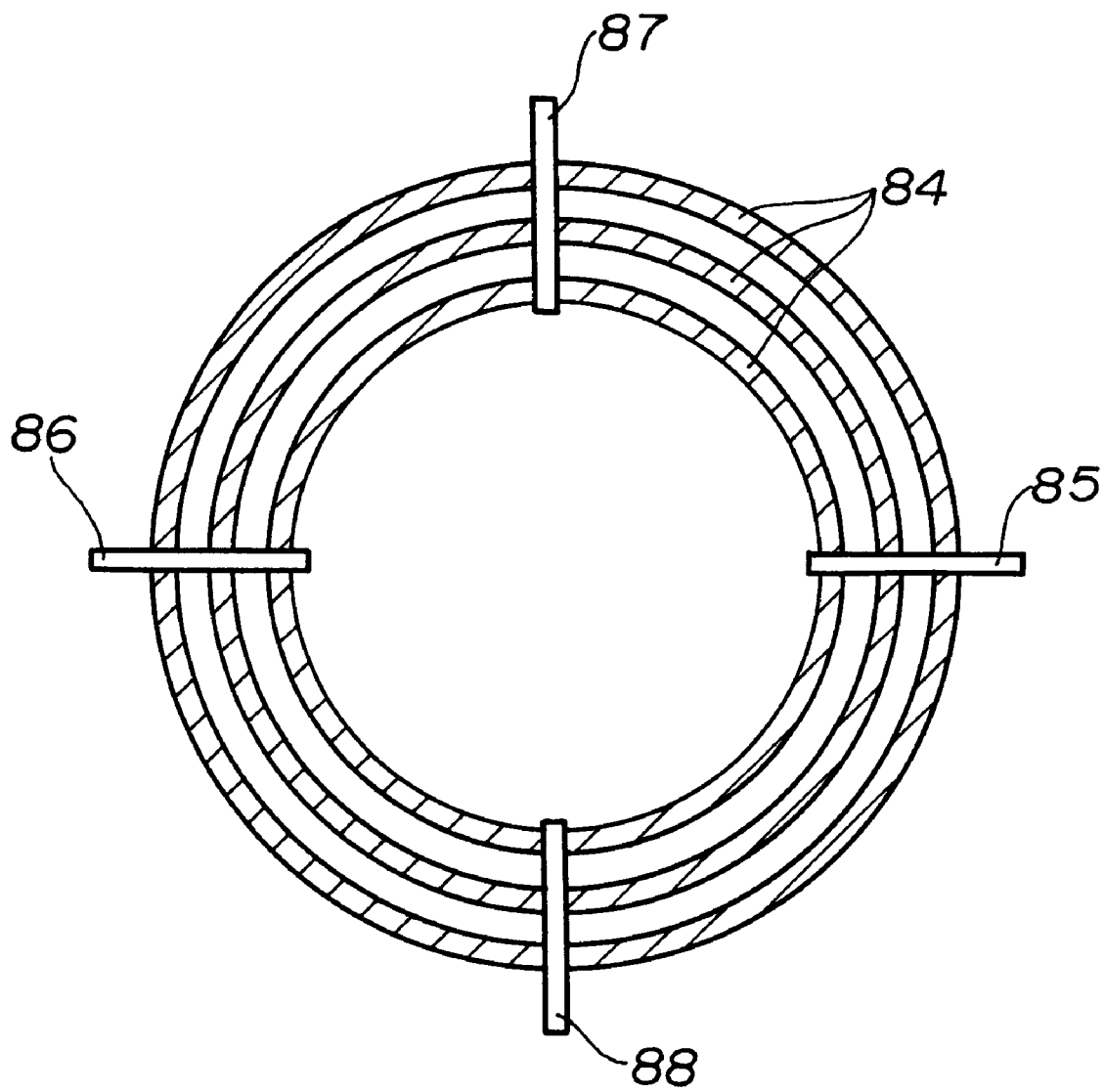
FIG. 13 is a diagram showing a variant of the coordinate-detecting pad shown in FIG. 12.

FIG. 13 is a diagram showing a variant of the coordinate-detecting pad 13a with a plurality of ring-shaped resistive layer patterns. When the voltages are alternately applied to four electrodes provided on respective resistive layer patterns in the above-described manner, angular displacement of a plurality of operation parts can be detected. Therefore, the angular displacement detection device can be used for a wider range of applications.

Figure 9:
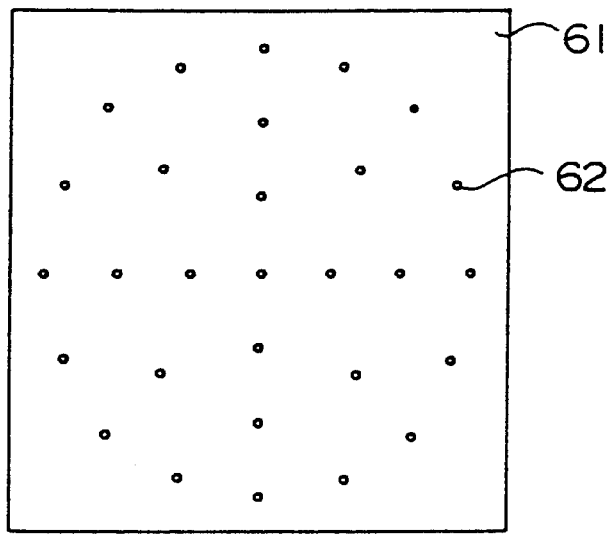
FIG. 9 is a diagram showing an example of spacers used in each embodiment of the present invention.
Figure 10:
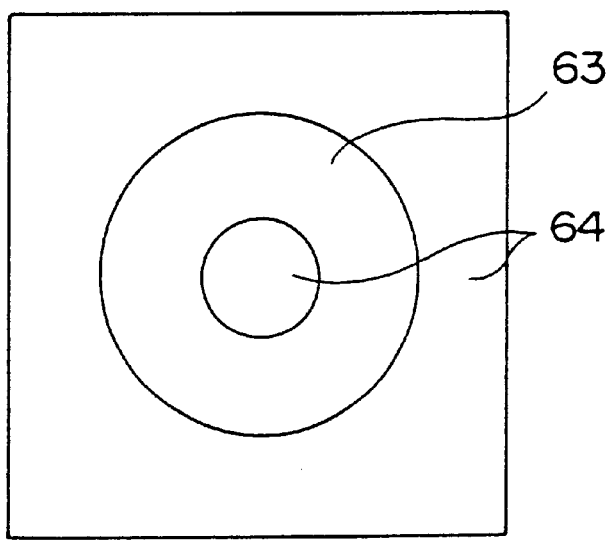
FIG. 10 is a diagram showing another example of spacers used in each embodiment of the present invention.

Also, the spacers 16 used for the coordinate-detecting pad 13 or 13a are located as shown in FIG. 9 or in FIG. 10.

Figure 2A:
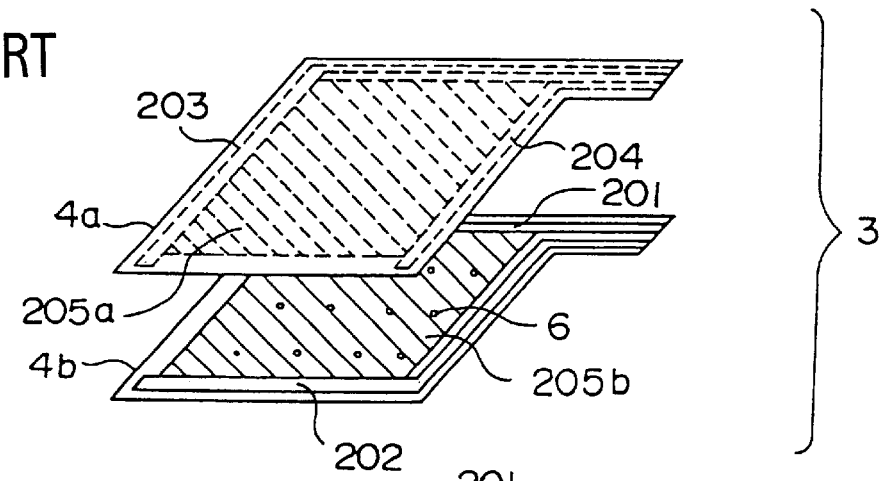
FIGS. 2A to 2D are diagrams showing resistive layers and spacers of the related art.
Figure 2B:
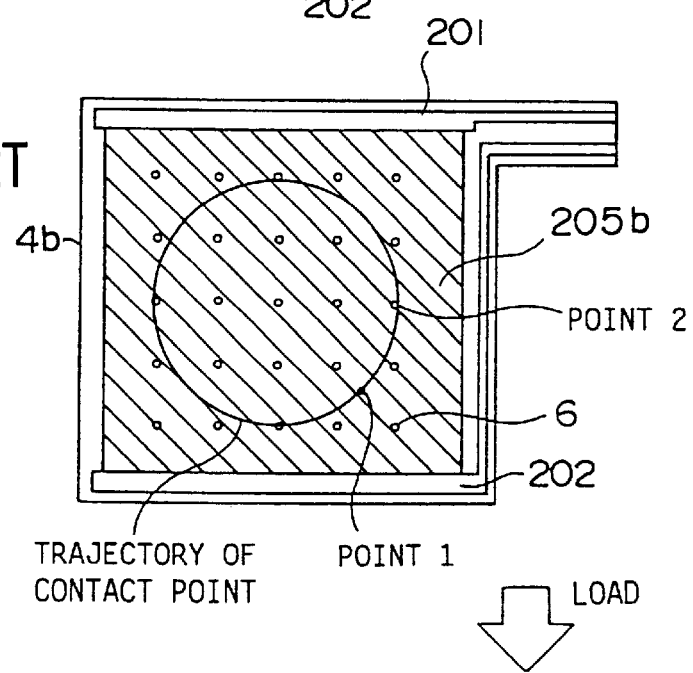

In the coordinate-detecting device of the related art, the spacers are provided vertically and horizontally on the resistive layer as shown in FIG. 2B.

Figure 2C:
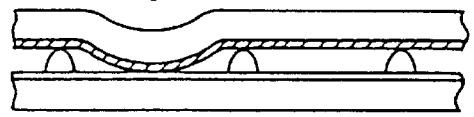
Figure 2D:
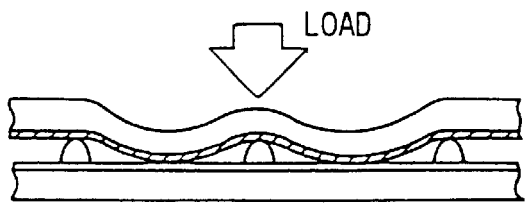

In such a structure, when the contact point is not on the spacers (FIG. 2B, point 1), the divided voltages will be accurately detected at the coordinate-detecting device (FIG. 2C). However, when the contact point is on the spacer (FIG. 2B, point 2), the two sheets will not be in good contact. Then, since the spacers are made of an insulating material, the coordinate-detecting device cannot detect or cannot accurately detect the divided voltages (FIG. 2D).

Therefore, with the angular-displacement detecting devices of the embodiments shown in FIGS. 4 and 5, the spacers are provided as shown in FIGS. 9 and 10. FIG. 9 is a diagram showing a structure where dot spacers 62 are provided on an input area 61 of the sheet 14a forming concentric circles having the shaft 17 as the center. FIG. 10 is a diagram showing a structure where spacers 64 are provided such that an input area 63 of the sheet 14a is exposed in an annular shape having the shaft 17 as the center.

With the above-described structures, the angular-displacement detecting device using the spacers of the present invention excludes the spacers from the trajectory of the detecting point. Thereby, it is possible to detect the voltages with a higher accuracy.

Figure 6:
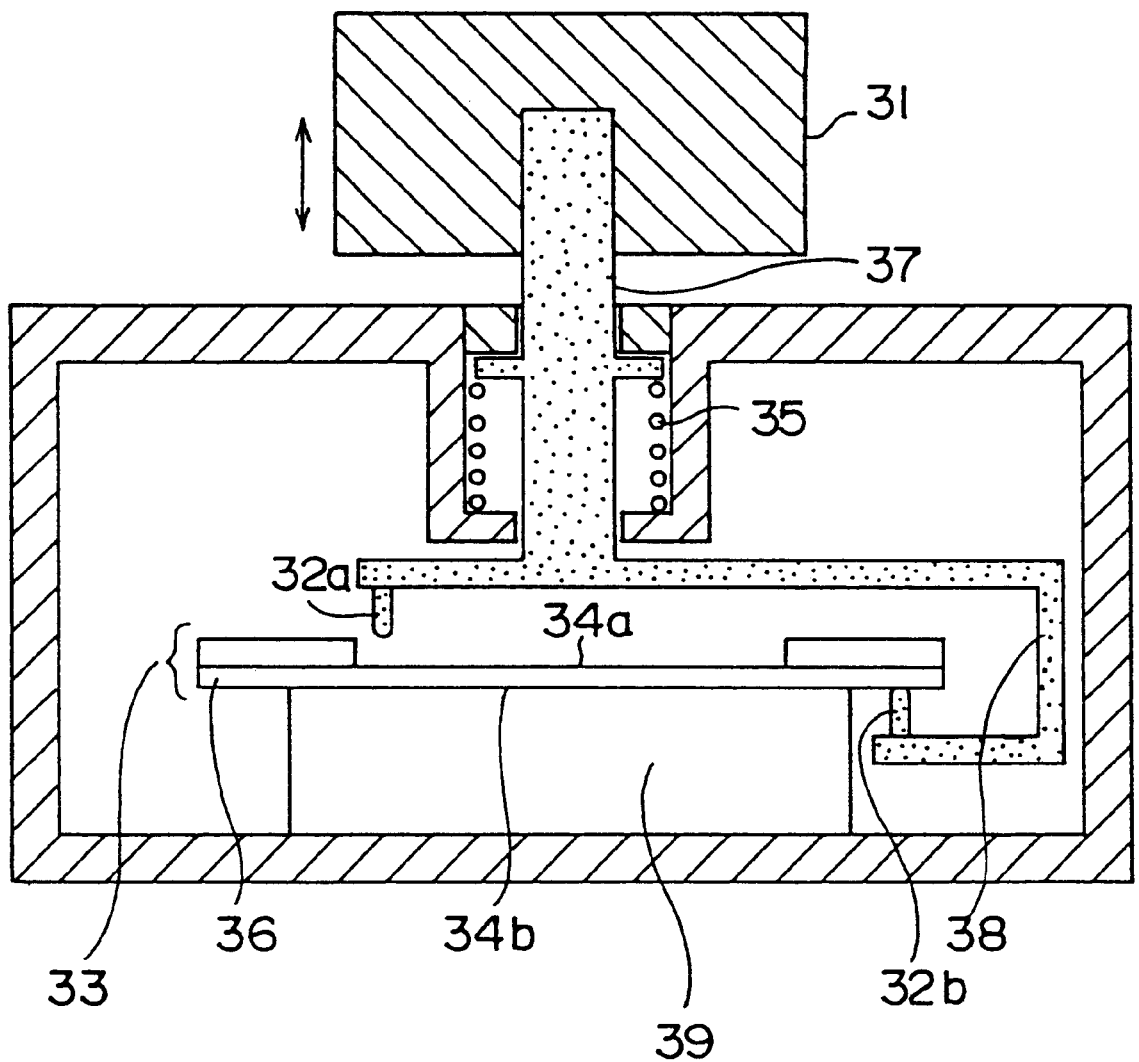
FIG. 6 is a cross-sectional diagram showing a third embodiment of the angular-displacement detecting device according to the present invention.

FIG. 6 is a cross-sectional diagram showing a third embodiment of the angular-displacement detecting device according to the present invention.

As shown in FIG. 6, the angular-displacement detecting device of the present embodiment includes a coordinate-detecting device 39 of a voltage-detecting type, a first contact part 32a and a second contact part 32b. The first and second contact parts 32a and 32b are capable of circularly sliding on a coordinate-detecting pad 33 via a bent arm 38. The first contact part 32a and the second contact part 32b slide in an interlocked manner with an angular motion of an operation part 31 which is rotatable about a shaft 37. The angular-displacement detecting device of the present embodiment measures features related to an angular motion of the operation part 31 through a sliding motion of the first contact part 32a and the second contact part 32b. The measurement is based on the divided voltages of the contact point detected at the coordinate-detecting device 39.

The first contact part 32a and the second contact part 32b slide on the coordinate-detecting pad 33 each with a different radius of rotation. The radius of rotation of the first contact part 32a is smaller than the radius of rotation of the second contact part 32b. Therefore, the second contact part 32b of the larger radius of rotation has a higher resolution of an angle of rotation.

The angular-displacement detecting device of the present invention is provided with a spring 35 placed around the shaft 37 and operable vertically upwards and downwards relative to the coordinate-detecting pad 33. The first contact part 32a is normally in a non-contact state due to the recovery force of the spring 35, whereas the second contact part 32b is normally in a contact state. Also, when the operation part 31 is depressed, the first contact part 32a is in a contact state and the second contact part 32b is in a non-contact state.

Figure 7A:
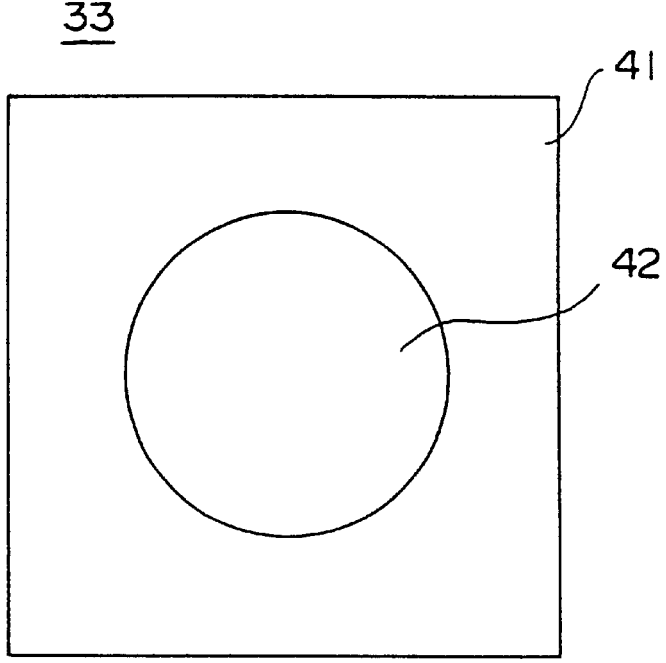
FIGS. 7A to 7C are diagrams showing a top view, a side view and a bottom view, respectively, of an example of a coordinate-detecting pad used in the third embodiment.
Figure 7B:
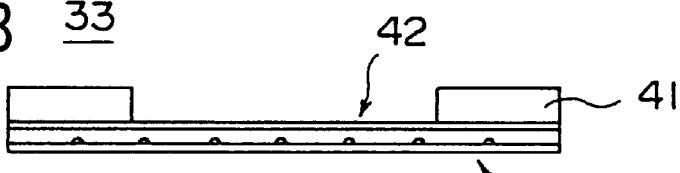
Figure 7C:
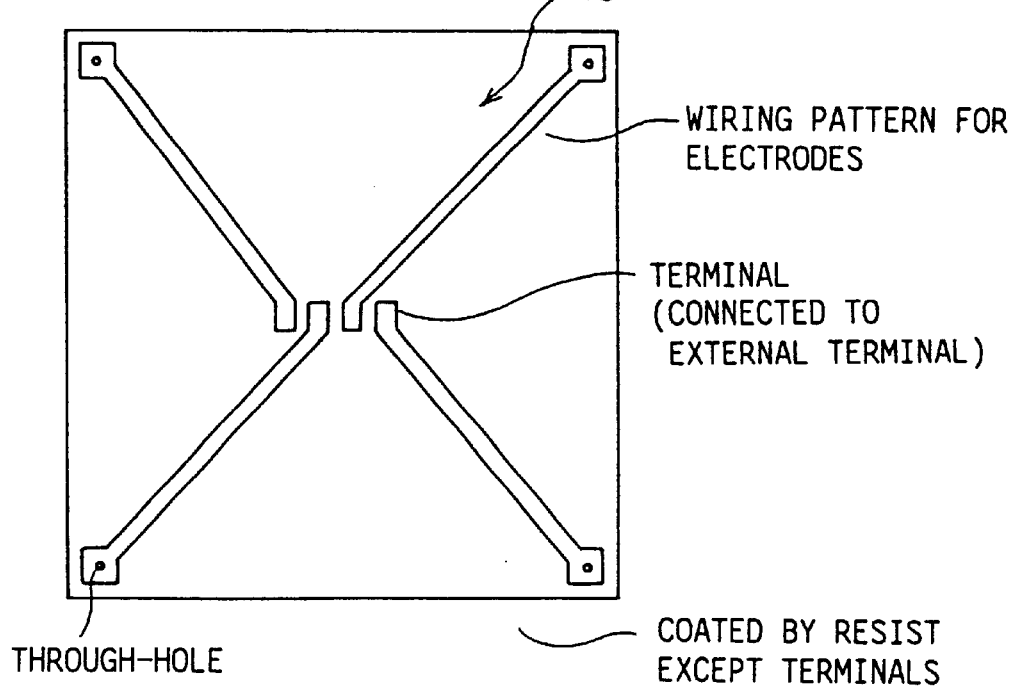

The coordinate-detecting device 39 of the present embodiment includes the coordinate-detecting pad 33 of the present invention (equivalent to a coordinate-detecting pad shown in FIGS. 7A–C). Also, the coordinate-detecting device 39 includes the voltage detecting part 307, the memory part 308 and the control part 306 of the coordinate-detecting device 8 shown in FIG. 3B.

The coordinate-detecting pad 33 has a contact surface for the first contact part 32a or the second contact part 32b to slide thereon. Also, for the coordinate-detecting device 39, identical components and identical functions as those described with reference to FIG. 3A and 3B will be designated by identical reference numerals and will not be described in detail.

The coordinate-detecting pad 33 has two sheets 34a, 34b opposing each other with insulating spacers 36 provided between the sheets 34a, 34b. Further, as shown in FIG. 11, one sheet 34a is provided with a resistive layer 71 and the other sheet 34b is provided with a conductive layer 72.

The sheet 34a provided with the resistive layer 71 has two pairs of electrodes 73, 74 and 75, 76 provided at the edges and opposing each other with the resistive layer 71 placed between the pairs of electrodes. Also, the pair of electrodes 73, 74 and the pair of electrodes 75, 76 are positioned so as to be perpendicular to each other. For example, the voltage applied to the pair of electrodes 73, 74 is divided, so that a divided voltage (corresponding to the x-coordinate) is produced and detected at an electrode 77 on the sheet 34b. The voltage applied to the pair of electrodes 75, 76 is divided, so that a divided voltage (corresponding to the y-coordinate) is produced and detected at the electrode 77 on the sheet 34b.

As shown in FIGS. 7A to 7C, the coordinate-detecting pad 33 is provided with a reinforcement plate 41 for withstanding a pressure applied vertically upwards or downwards. The coordinate-detecting pad 33 is provided with an upper input area 42 and a lower input area 43. The first contact part 32a can make a contact on the upper input area 42 and the second contact part 32b can make a contact on the lower input area 43.

Figure 1:
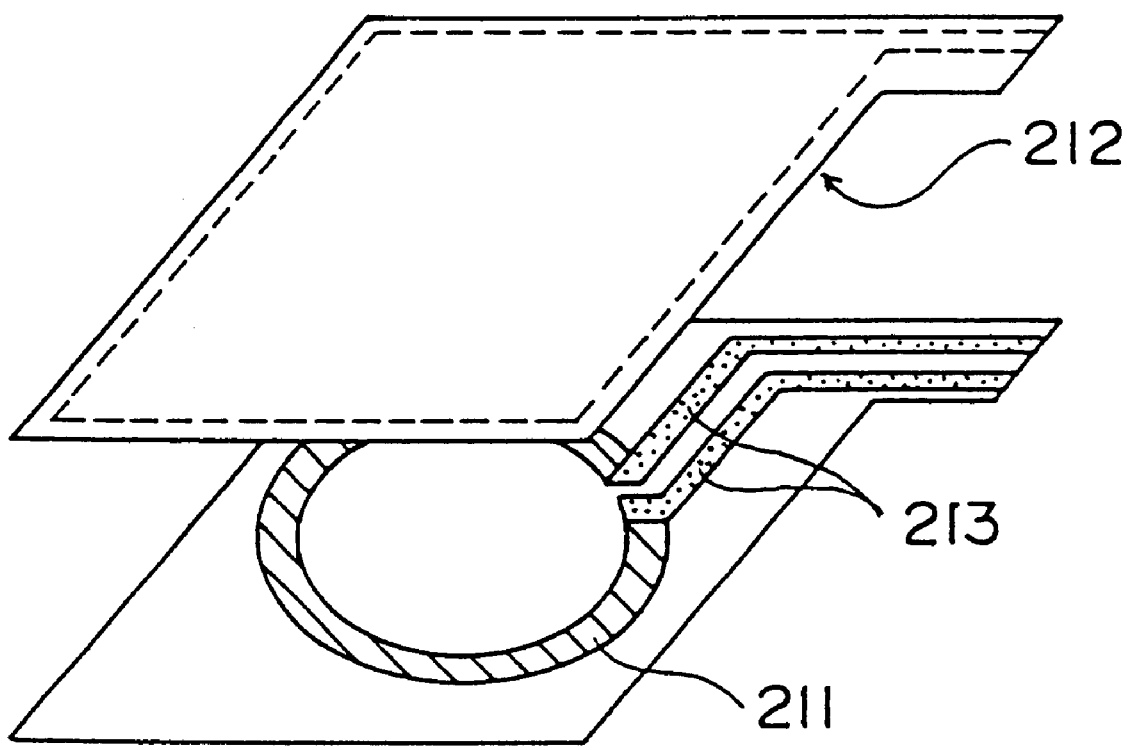
FIG. 1 is a perspective diagram showing a resistive pad used in a potentiometer of a resistance-division type.

In the following description, the coordinate-detecting pad 33 is described. However, it is also possible to use other coordinate-detecting pads such as a pad formed by providing a reinforcement plate on the coordinate-detecting pad 3 shown in FIG. 1. The spacers 36 are made of an insulating material.

Further, the control part 306 controls a process of alternately turning on the pair of transistors 301, 302 which applies voltages between the pair of electrodes 73, 74 and the pair of transistors 303, 304 which applies voltages between the pair of electrodes 75, 76. Also, in the present embodiment, the control part 306 detects the divided voltages corresponding to the x-coordinate and the y-coordinate from the electrode 77 on the sheet 34b. Therefore, the control part 306 does not operate the transistor 305.

In the following, a processing operation of the angular-displacement detecting device of the present invention of the above-described structure will be described briefly.

Referring to FIGS. 3A, 3B and 6, normally (i.e., in an initial state), the second contact part 32b and the coordinate-detecting pad 33 are in a contact state due to the recovery force of the spring 35. Thereby, the coordinate-detecting device 39 recognizes the position of the contact point of the second contact part 32b.

When the two sheets 34a, 34b are in contact at the initial contact point, first, the control part 306 applies a predetermined voltage to the electrode 73. The applied voltage is divided at the contact point, and a voltage representing the x-coordinate is output via the electrode 77 on the sheet 34b.

Then, the control part 306 applies a voltage to the electrode 75 in a similar manner. This voltage is divided at the contact point, and a voltage representing the y-coordinate is output via the electrode on the sheet 34b.

Thus, by alternately applying voltages to electrodes 73 and 75, the voltage-detecting part 307 detects, for example, a voltage V1 representing the x-coordinate and a voltage V2 representing the y-coordinate.

After detecting the divided voltages, the control part 306 accesses the storage part 308 so as to search for coordinate data corresponding to divided voltages representing the x-coordinate and the y-coordinate of the contact point detected at the voltage detecting part 307. Thus, the control part 306 detects the position of the contact point in the initial state based on the obtained coordinate data, which corresponds to a starting point of the angular motion of the operation part 31. Also, from the position of the contact point (from the radius of rotation), the control part 306 recognizes that this contact is made by the second contact part 32b. In this case, the detected contact point is assumed to be located in the fourth quadrant (IV) shown in FIG. 16A.

In this state, the operation part 31 is rotated by the user. Then, the control part 306 periodically obtains the coordinate data in the above-described manner. The control part 306 calculates a relative value of the difference between the initial coordinate data and the current coordinate data. If the initial contact point exists in the fourth quadrant (IV) and, for example, the relative value of the y-coordinate is negative or the relative value of the x-coordinate is negative, the control part 306 determines that the direction of rotation of the contact part 2 is clockwise (FIG. 16B).

Now, the control part 306 can obtain an angle of rotation of the operation part 31 using the determined direction of rotation and the relative value. Also, the control part 306 can determine a number of rotations of the operation part 31 by periodically obtaining the coordinate data. Further, the control part 306 is capable of measuring not only the angle of rotation and the number of rotations, but also other features related to an angular motion through calculations carried out by the software.

Thus, the control part 306 can obtain the sliding motion and the features related to an angular motion of the second contact part 34b.

When the user depresses the operation part 31, the two sheets 34a, 34b become in contact at the contact point of the first contact part 32a and the coordinate-detecting pad 33. Then, the control part 306 starts detecting divided voltages at the contact point.

First, the control part 306 applies a predetermined voltage to the electrode 73. The applied voltage is divided at the contact point, and a voltage representing the x-coordinate is output via the electrode 77 on the sheet 34b.

Then, the control part 306 applies a voltage to the electrode 75 in a similar manner. This voltage is divided at the contact point, and a voltage representing the y-coordinate is output via the electrode 77 on the sheet 34b.

Thus, by alternately applying voltages to electrodes 73 and 75, the voltage-detecting part 307 detects, for example, a voltage V3 representing the x-coordinate and a voltage V4 representing the y-coordinate.

After detecting the divided voltages, the control part 306 accesses the storage part 308 so as to search for coordinate data corresponding to divided voltages representing the x-coordinate and the y-coordinate of the contact point detected at the voltage-detecting part 307. Thus, from the obtained data, the control part 306 detects the position of the contact point corresponding to a start point of the angular motion of the operation part 31. Also, from the position of the contact point (the radius of rotation), the control part 306 recognizes that this contact is made by the first contact part 32a. In this case, the detected contact point is assumed to be located in the fourth quadrant (IV) shown in FIG. 16A.

In this state, the operation part 31 is rotated by the user. Then, the control part 306 periodically obtains the coordinate data in the above-described manner. The control part 306 calculates a relative value of the difference between the initial coordinate data and the current coordinate data. If the initial contact point exists in the fourth quadrant (IV) and, for example, the relative value of the y-coordinate is negative or the relative value of the x-coordinate is negative, the control part 306 determines that the direction of rotation of the contact part 2 is clockwise (FIG. 16B).

The control part 306 can obtain an angle of rotation of the operation part 31 using the direction of rotation and the relative value. Also, the control part 306 can obtain a number of rotations of the operation part 31 by periodically obtaining the coordinate data.

Thus, the control part 306 is capable of recognizing the sliding motion and other features related to an angular motion of the first contact part 34a.

As has been described, the control part 306 is capable of recognizing the sliding motion by the first contact part 34a and the sliding motion by the second contact part 34b.

The angular-displacement detecting device shown in FIG. 6 can be operated in an advantageous manner using the fact that the second contact part 34b has a good resolution. That is, the angular-displacement detecting device can be used for coarse adjustment when the operational part 31 is rotated in a depressed state, and can be used for fine adjustment when the operational part 31 is rotated without being depressed.

Figure 8A:
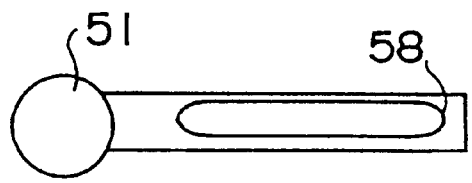
FIGS. 8A to 8C are diagrams showing a fourth embodiment of the angular-displacement detecting device according to the present invention.
Figure 8B:
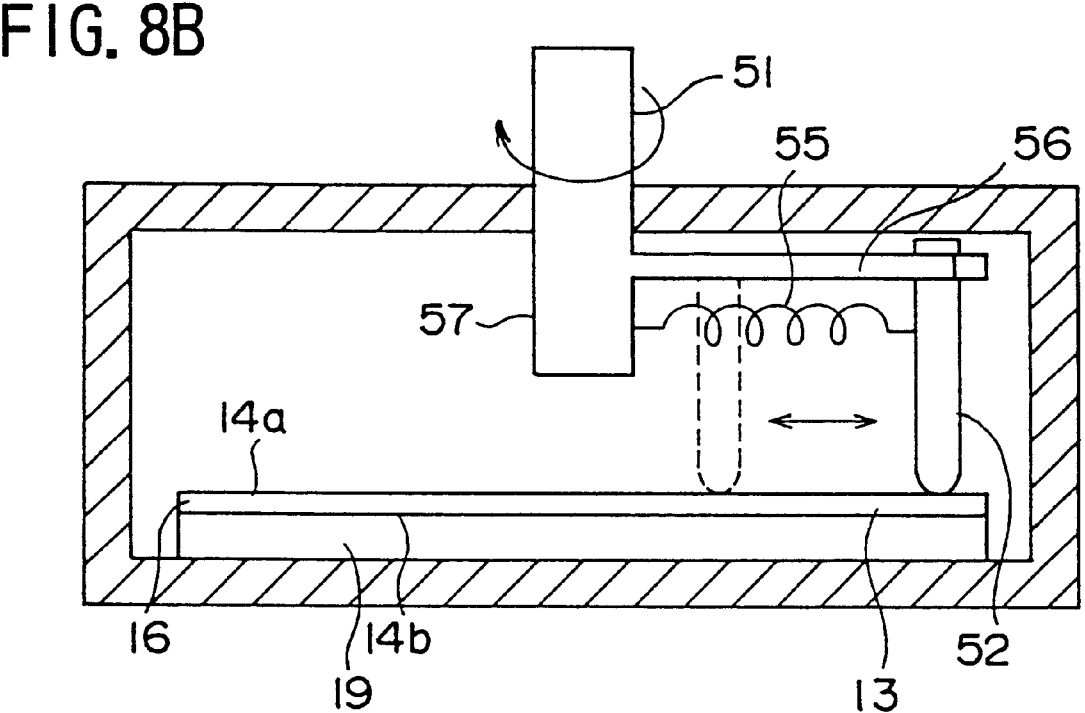
Figure 8C:
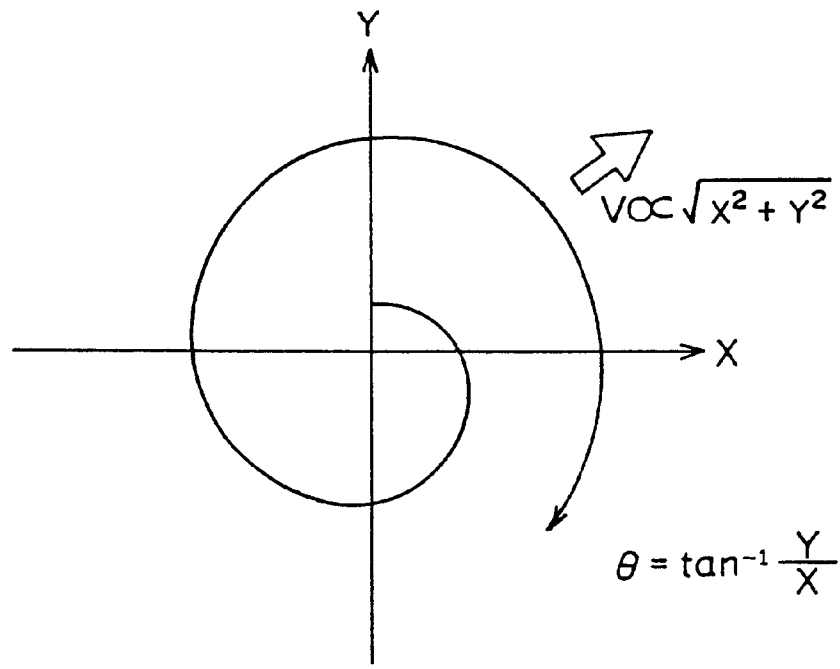

FIGS. 8A to 8C are diagrams showing a fourth embodiment of the angular-displacement detecting device according to the present invention.

As shown in FIGS. 8A to 8C, the angular-displacement detecting device of the present embodiment includes a coordinate-detecting device 19 of a voltage-detecting type and a contact part 52 capable of circularly sliding on the coordinate-detecting pad 13. The coordinate-detecting device 19 is similar to the coordinate-detecting device shown in FIG. 4. The contact part 52 slides in an interlocked manner with an angular motion of an operation part 51 which is rotatable about a shaft 57. The angular-displacement detecting device of the present embodiment measures features related to an angular motion of the operation part 51 through a sliding motion of the contact part 52. The measurement is based on the divided voltages of the contact point detected at the coordinate-detecting device 19.

As shown in FIG. 8B, the angular-displacement detecting device of the present invention includes a slit 58, an arm 56 for helping a radial movement of the contact part 52, and a spring 55 attached in parallel with the arm 56. Initially, the coordinate-detecting pad 13 and the contact part 52 are in contact near the center of the pad 13. As shown in FIG. 8C, the radius of rotation of the contact point will vary due to the centrifugal force caused by the angular velocity of the operation part 51, which is due to the recovery force of the spring 55.

In the following, an operation of the angular-displacement detecting device of the present embodiment will be described.

In the following, the angular-displacement detecting device of the present embodiment will be described with reference to FIGS. 3, 8A–8C and 11. Normally (i.e., in an initial state), the contact part 52 and the coordinate-detecting pad 13 are in contact. Thereby, the coordinate-detecting device 19 recognizes the position of the contact point of the contact part 52.

When the two sheets 14a, 14b are in contact at the initial contact point, first, the control part 306 applies a predetermined voltage to the electrode 73. This voltage is divided at the contact point and output as a divided voltage representing the x-coordinate via the electrode 77 on the sheet 14b.

Next, the control part 306 applies a voltage similar to that described above to the electrode 75. This voltage is also divided at the contact point in a similar manner, and is output as a divided voltage representing the y-coordinate via the electrode 77 on the sheet 14b.

Thus, by alternately applying voltages on the electrodes 73 and 75, the voltage-detecting part 307, for example, detects a voltage V1 representing the x-coordinate and a voltage V2 representing the y-coordinate.

After detecting the divided voltages, the control part 306 accesses the storage part 308 so as to search for coordinate data corresponding to divided voltages representing the x-coordinate and the y-coordinate of the contact point detected at the voltage-detecting part 307. Thus, based on the obtained coordinate data, the control part 306 detects the position of the contact point corresponding to a starting point of the angular motion of the operation part 51. The control part 306 also detects the distance (radius of rotation) between the contact part 52 and the shaft at that point. In this case, the detected contact point is assumed to be located in the fourth quadrant (IV) shown in FIG. 16A.

In this state, the operation part 51 is rotated by the user. Then, the control part 306 periodically obtains the coordinate data in the above-described manner. The control part 306 recognizes a current position of the contact point and the distance (radius of rotation) between the contact part 52 at the obtained position and the shaft 57.

The control part 306 calculates a relative value from the difference between the initial coordinate data and the current coordinate data. If the initial contact point exists in the fourth quadrant and, for example, the relative value of the y-coordinate is negative or the relative value of the x-coordinate is negative, the control part 306 recognizes that the direction of rotation of the contact part 2 is clockwise (FIG. 16B).

The control part 306 can obtain an angle of rotation θ of the operation part 51 using the position of the original contact point (coordinate data (X, Y)) and the position of the current contact point (coordinate data (X, Y)). The angle of rotation θ can be obtained by an equation expressed as:

$$\theta = \tan^{-1}(Y/X).$$

Also, the control part 306 can obtain the angular velocity V of the control part 51 from the current radius of rotation (distance between the coordinate (0,0) and (X,Y) in FIG. 7C) by using the following equation:

$$V \sqrt{X^2 + Y^2}.$$

Further, by periodically obtaining the coordinate data, a number of rotations of the operation part 51 can be obtained. Also, the control part 306 is capable of measuring not only the angular displacement, the angular velocity and the number of rotations, but also other features related to the angular motion through calculations performed by the software.

Figure 15B:
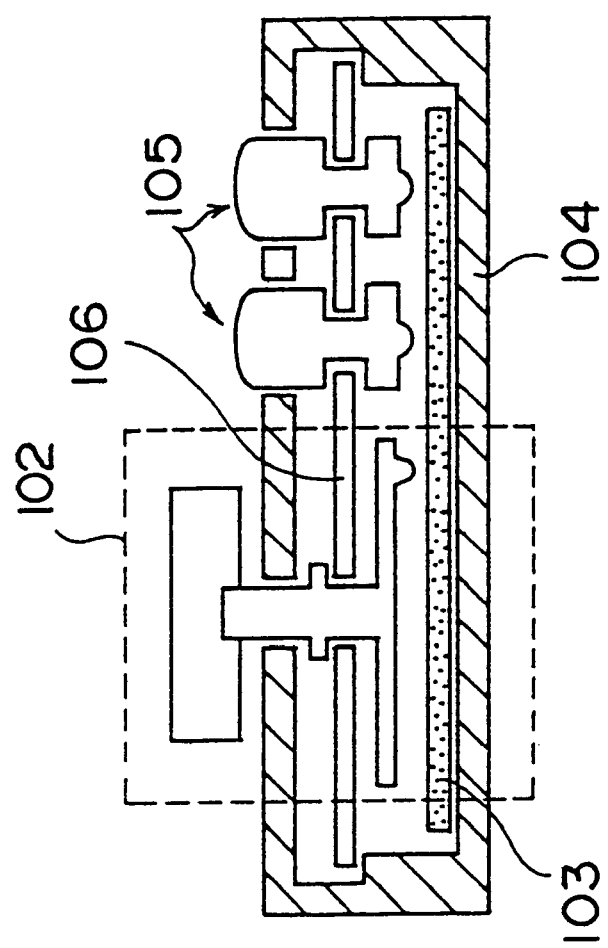
FIGS. 15A and 15B are diagrams showing a remote controller which is an example of an application of the angular-displacement detecting device of the first to fourth embodiments of the present invention.
Figure 15A:
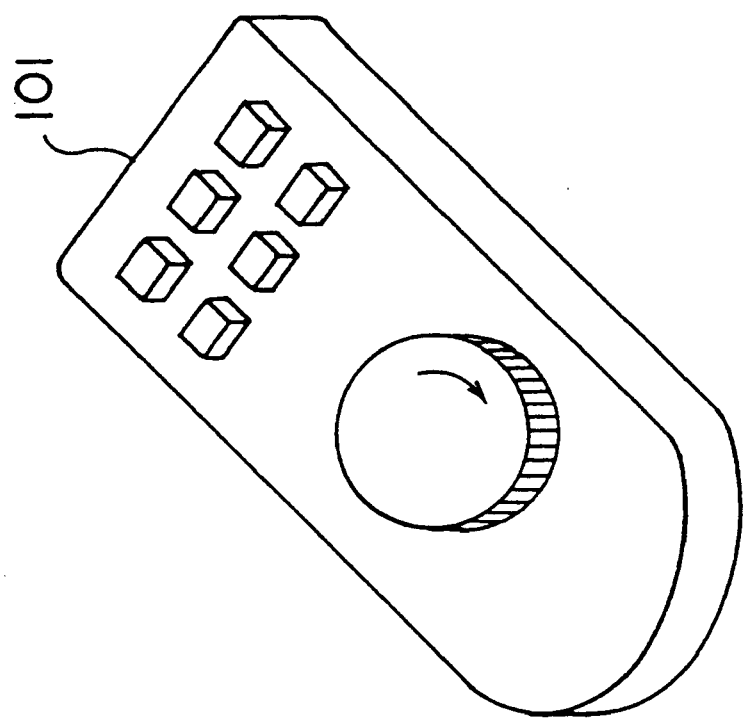

FIGS. 15A and 15B are diagrams showing a remote controller which is an example of an application of the angular-displacement detecting device of the first to fourth embodiments of the present invention.

FIG. 15A is a perspective view showing an appearance of a remote controller 101. As shown in FIG. 15B, the controller 11 includes a housing 104, an angular-displacement detecting device 102 of the present invention, buttons 105 and a leaf spring 106. The housing 104 covers the angular-displacement detecting device 102, the buttons 105 and the leaf spring 106. The leaf spring 106 is provided for helping pressing down of the device 102 and the buttons 105.

When one of the buttons 105 is depressed, the coordinate-detecting device 103 detects at which point the contact surface of the coordinate-detecting device 103 has been depressed. Thereby, with the remote controller 101, it is possible to implement operations such as controlling ON/OFF state of the power supply and changing over between channels.

Further, with the remote controller 101, it is possible to implement various adjustment operations such as adjustment of volume, luminance and temperature settings by rotating the operation part of the angular-displacement detecting device 102.

Further, the present invention is not limited to these embodiments, but variations and modifications may be made without departing from the scope of the present invention.

The present application is based on Japanese priority application No. 10-003408 filed on Jan. 9, 1998, the entire contents of which are hereby incorporated by reference.

What is claimed is:

1. A device comprising:
    a coordinate-detecting sheet; and
    a rotating member having a contact part which circularly slides on the coordinate-detecting sheet, wherein coordinate data of coordinates of the contact part on the coordinate-detecting sheet is output based on a voltage from the coordinate-detecting sheet.

2. The device as claimed in claim 1,
    further comprising a circuit which generates a signal indicating an angular displacement of the contact part on the basis of the coordinate data.

3. The device as claimed in claim 1,
    further comprising a circuit which generates a signal indicating an angular velocity of the contact part on the basis of the coordinate data.

4. The device as claimed in claim 1,
    further comprising a circuit which generates a signal indicating a number of rotations of the contact part on the basis of the coordinate data.

5. An angular-displacement detecting device comprising:
a coordinate-detecting device of a voltage-detection type for detecting coordinate data of a contact point on a coordinate-detecting pad based on voltages corresponding to the contact point; and
a sliding part capable of circularly sliding on the coordinate-detecting pad in an interlocked manner with an angular motion of an operation part which is rotatable about a shaft,
wherein features related to the angular motion of the operation part are measured based on the detected coordinate data.

6. The angular-displacement detecting device as claimed in claim 5,
wherein one of the features related to the angular motion of the operation part is angular displacement.

7. The angular-displacement detecting device as claimed in claim 5,
wherein one of the features related to the angular motion of the operation part is angular velocity.

8. The angular-displacement detecting device as claimed in claim 5,
wherein one of the features related to the angular motion of the operation part is number of rotations.

9. The angular-displacement detecting device as claimed in claim 5,
wherein the sliding part is provided with a spring operable vertically upwards and downwards relative to the coordinate-detecting pad, said spring holding said sliding part in a non-contact state by the recovery force of the spring, and
the sliding part comes into contact with the coordinate-detecting pad when the operation part is depressed.

10. The angular-displacement detecting device as claimed in claim 5,
wherein the sliding part is provided with a spring operable vertically upwards and downwards relative to the coordinate-detecting pad, said spring holding said sliding part so as to be in a contact state with either a front surface or a back surface of the coordinate-detecting pad by the recovery force of the spring, and
the sliding part comes into contact with the other one of the front and back surfaces of the coordinate-detecting pad when the operation part is depressed.

11. The angular-displacement detecting device as claimed in claim 5,
wherein the sliding part is provided with a spring such that the contact point against the coordinate-detecting pad is movable in a radial direction, said spring holding said sliding part in a contact state with the coordinate-detecting pad near the center of the coordinate-detecting pad by the recovery force of the spring, and
the radius of rotation of the contact point varies due to a centrifugal force caused by the angular velocity of the operation part.

12. The angular-displacement detecting device as claimed in claim 5,
wherein the coordinate-detecting pad includes two sheets and insulating spacers provided between the sheets.

13. The angular-displacement detecting device as claimed in claim 12,
wherein each of said sheets is provided with a substantially rectangular resistive film and a pair of electrodes, said pair of electrodes being formed such that respective electrodes are parallel to each other and located at opposing sides of the substantially rectangular resistive film, said sheets being located such that the pairs of electrodes formed on the respective sheets are perpendicular to each other, whereby when said substantially rectangular resistive films are in contact with each other with the voltage being applied across a pair of electrodes on one of the sheets, coordinate information is detected using electric information obtained via the resistive film and the pair of electrodes on the other sheet, the electric information being dependent on the position of the contact point.

14. The angular-displacement detecting device as claimed in claim 12,
wherein one of said sheets is provided with a substantially rectangular resistive film and the other one of the sheets is provided with a conductive film having substantially the same shape as said resistive film; and
wherein the sheet provided with the substantially rectangular resistive film has two pairs of electrodes, each pair of electrodes being formed such that respective electrodes are parallel to each other and located at opposing sides of the resistive film, said two pairs of electrodes being placed so as to be perpendicular to each other, whereby, when said substantially rectangular resistive film and the conductive film are in contact with the voltage being applied across one pair of electrodes, coordinate information is detected using electric information obtained via the conductive film.

15. The angular-displacement detecting device as claimed in claim 12,
wherein one of said sheets is provided with a ring-shaped resistive film and the other one of the sheets is provided with a conductive film; and
wherein said sheet provided with the ring-shaped resistive film has two pairs of electrodes, each pair of electrodes being formed such that respective electrodes are located diametrically opposite to each other, said two pairs of electrodes being placed so as to be shifted through a right angle from each other, whereby, when said ring-shaped resistive film and the conductive film are in contact with the voltage being applied across one pair of electrodes, angular information is detected using electric information obtained via the conductive film.

16. The angular-displacement detecting device as claimed in claim 12,
wherein the spacers are provided on the sheet in concentric circles having an axis of rotation as the center.

17. The angular-displacement detecting device as claimed in claim 12,
wherein the spacers are provided on one of the sheets such that the sheet is exposed in an annular shape.

* * * * *